US012345080B2

(12) United States Patent
Krebs et al.

(10) Patent No.: US 12,345,080 B2
(45) Date of Patent: Jul. 1, 2025

(54) CARRIAGE FOR A WINDOW OR DOOR WITH HEIGHT ADJUSTMENT

(71) Applicant: Roto Frank Fenster—und Türtechnologie GmbH, Leinfelden-Echterdingen (DE)

(72) Inventors: Martin Krebs, St. Johann (DE); Winfried Reich, Berglen (DE); Choongeun Park, Stuttgart (DE); Tamas Nyikos, Sopron (HU)

(73) Assignee: Roto Frank Fenster—und Türtechnologie GmbH, Leinfelden-Echterdingen (DE)

( * ) Notice: Subject to any disclaimer, the term of this patent is extended or adjusted under 35 U.S.C. 154(b) by 146 days.

(21) Appl. No.: 18/169,784

(22) Filed: Feb. 15, 2023

(65) Prior Publication Data

US 2023/0193677 A1 Jun. 22, 2023

Related U.S. Application Data

(63) Continuation of application No. PCT/EP2021/070839, filed on Jul. 26, 2021.

(30) Foreign Application Priority Data

Aug. 17, 2020 (DE) ..................... 10 2020 210 444.1

(51) Int. Cl.
*E05D 15/06* (2006.01)

(52) U.S. Cl.
CPC .... *E05D 15/0669* (2013.01); *E05Y 2201/638* (2013.01); *E05Y 2201/64* (2013.01);
(Continued)

(58) Field of Classification Search
CPC ........... E05D 15/0669; E05Y 2201/638; E05Y 2201/64; E05Y 2600/12; E05Y 2600/312; E05Y 2900/132; E05Y 2900/148
See application file for complete search history.

(56) References Cited

U.S. PATENT DOCUMENTS 2,668,318 A * 2/1954 Bon, III .............. E05D 15/0669 16/105
3,996,643 A * 12/1976 Steigerwald ........ E05D 15/0669 16/99
(Continued)

FOREIGN PATENT DOCUMENTS

| | | | |
|---|---|---|---|
| AU | 2009208119 | A1 | 3/2010 |
| CN | 1155766 | C | 6/2004 |

(Continued)

*Primary Examiner* — Jason W San
*Assistant Examiner* — Matthew J Sullivan
(74) *Attorney, Agent, or Firm* — Orbit IP, LLP; Marc G. Martino

(57) ABSTRACT

A carriage has a wing part which can be fastened to a wing and a roller part which is displaceable on a running rail. The wing part is displaceable in a positively controlled manner transversely to the running rail. The roller part has a height-adjustable roller upper part. The vertical adjustability of the roller upper part with respect to a roller holder of the roller part is achieved by means of an adjusting element which is displaceable by means of an adjusting screw. The adjusting element is preferably supported with at least one adjusting element bevel on a pendulum axle of the running roller holder and/or on an upper part bevel of the roller upper part.

20 Claims, 9 Drawing Sheets

(52) U.S. Cl.
CPC ..... *E05Y 2600/12* (2013.01); *E05Y 2600/312* (2013.01); *E05Y 2900/132* (2013.01); *E05Y 2900/148* (2013.01)

(56) References Cited

U.S. PATENT DOCUMENTS

| | | | | | |
|---|---|---|---|---|---|
| 4,014,073 | A * | 3/1977 | Uehara | E05D 15/0669 | 252/604 |
| 4,262,451 | A * | 4/1981 | Dallaire | E05D 15/0669 | 16/99 |
| 5,018,306 | A * | 5/1991 | Prevot | E05D 15/06 | 49/425 |
| 5,791,089 | A * | 8/1998 | Prevot | E05D 15/0669 | 49/425 |
| 6,526,625 | B2 * | 3/2003 | Becken | E05D 15/0669 | 16/99 |
| 6,681,445 | B2 * | 1/2004 | Huang | E05D 15/0669 | 16/105 |
| 7,770,329 | B2 * | 8/2010 | Hutnik | E05D 15/0669 | 49/411 |
| 8,522,398 | B2 * | 9/2013 | Haab | E05D 15/0634 | 16/105 |
| 9,080,359 | B2 * | 7/2015 | Horwood | E05D 15/0669 | |
| 10,392,844 | B2 * | 8/2019 | Kreyenborg | E05D 15/063 | |
| 11,274,480 | B2 * | 3/2022 | Minter | E05D 15/0634 | |
| 11,781,355 | B1 * | 10/2023 | Lammers | E05D 15/0634 | 16/105 |
| 11,788,334 | B2 * | 10/2023 | Bonomi | E05D 15/0686 | 49/452 |
| 11,993,967 | B2 * | 5/2024 | Scorcia | E05D 15/0669 | |
| 2019/0345749 | A1 | 11/2019 | Reich | | |
| 2021/0180392 | A1 | 6/2021 | Li et al. | | |

FOREIGN PATENT DOCUMENTS

| | | |
|---|---|---|
| CN | 201144584 | 11/2008 |
| CN | 204112969 | 1/2015 |
| CN | 104863460 | 8/2015 |
| CN | 204677065 | 9/2015 |
| CN | 204691515 | 10/2015 |
| CN | 206337986 | 7/2017 |
| CN | 209990307 | 1/2020 |
| DE | 10 2014 220 837 | 1/2016 |
| DE | 10 2016 121 459 | 5/2017 |
| DE | 10 2016 225 385 | 6/2018 |
| EP | 2 881 530 | 6/2015 |
| IT | TO20100790 | 3/2012 |
| TW | M301262 | 11/2006 |
| WO | 2011/100788 | 8/2011 |
| WO | 2012/042409 | 4/2012 |
| WO | 2013/073964 | 5/2013 |
| WO | 2018/218928 | 12/2018 |

* cited by examiner

CARRIAGE FOR A WINDOW OR DOOR WITH HEIGHT ADJUSTMENT

CROSS-REFERENCE TO RELATED APPLICATIONS

This continuation application claims priority to PCT/EP2021/070839 filed on Jul. 26, 2021 which has published as WO 2022/037905 A1 and also the German application number 10 2020 210 444.1 filed Aug. 17, 2020, the entire contents of which are fully incorporated herein with these references.

DESCRIPTION

Field of the Invention

The invention relates to a carriage arrangement according to the preamble of claim 1. The invention further relates to a window or a door having such a carriage arrangement.

Background of the Invention

It is known to provide a height adjustment on a carriage arrangement in order to be able to adjust the height, i.e., the vertical position, of the wing. Carriage arrangements with a height adjustment have become known from CN 201144584 Y, CN 204112969 U, CN 209990307 U and WO 2018/218928 A1.

Furthermore, it is known to provide carriage arrangements with a height adjustment, wherein the carriage arrangements are designed to place a wing in a positively controlled manner transversely to the main plane of a fixed frame and to be able to displace it parallel to this main plane. Generic carriage arrangements of this kind have become known from CN 104863460 A, CN 204677065 U, CN 204691515 U and CN 206337986 U.

Since wings are becoming ever larger and better insulated, the weight of the wings is also increasing. There is therefore a need to provide a carriage arrangement which, on the one hand, is sturdy enough to offload the weight of a heavy wing, but on the other hand permits height adjustment of the wing.

In particular, generic carriage arrangements have the disadvantage that an adjusting screw of the height adjustment abuts the running roller holder with the running rollers. If the running roller holder is pendulate, i.e., moves up and down on one side, for example because the running roller holder runs over an unevenness on the running rail, friction will occur at the adjusting screw, which on the one hand leads to wear and on the other hand leads to a restriction of the freedom of movement of the running roller holder.

SUMMARY OF THE INVENTION

Object of the Invention

It is therefore the object of the invention to provide a load-bearing carriage arrangement which enables a low-wear pendulum movement of the running roller holder in order to be able to compensate for unevennesses of the running rail and which additionally allows a smooth adjustment of the vertical position of the wing by a user. It is a further object of the invention to provide a window or a door with such a carriage arrangement.

DESCRIPTION OF THE INVENTION

This object is achieved according to the invention by a carriage arrangement having the characterizing features of claim 1 or by a window or a door according to claim 15. The dependent claims reflect preferred developments.

The object according to the invention is thus achieved by a carriage arrangement having a driving bar arrangement and a carriage, wherein the carriage has a wing part which can be fixedly mounted on the wing and has a roller part which is displaceable transversely, in particular perpendicularly, to the longitudinal axis thereof. In order to achieve this displacement, a driving bar of the driving bar arrangement engages with a control projection in a control slot of a roller upper part of the roller part, said control slot being is formed at least in sections obliquely to the longitudinal axis of the roller part. In the roller part the carriage has a running roller holder with rollers. Furthermore, for height adjustment the carriage has an adjusting element and an adjusting screw between the roller upper part and the adjusting element. The actuation of the adjusting screw brings about an at least horizontal movement of the adjusting element, wherein the adjusting element has a first bevel, by means of which the adjusting element displaces the roller holder indirectly or directly at least vertically when the adjusting screw is actuated. An at least vertical displacement is understood to mean a vertical movement or a mixture of horizontal and vertical movements.

According to the invention, it is thus provided that the adjusting screw does not abut the running roller holder, but rather the adjusting element. There is no wear on or any other impairment of the running roller holder caused by the adjusting screw.

The descriptions "above," "below," "horizontal," "vertical" etc. refer to the installed state of the carriage arrangement.

The height adjustment is preferably decoupled from the movement of the driving bar, so that a displacement of the driving bar does not lead to the adjustment of the vertical height of the wing. The height adjustment thus serves only for adjusting the wing height—which remains unchanged during opening and closing of the wing—and not for the opening or closing of the wing.

The first bevel represents a slope or a vertical rise. The first bevel can have straight sections and/or curved sections. Preferably, the first bevel takes the form of a straight rising ramp.

The adjusting screw is particularly preferably guided on the roller upper part. The longitudinal axis of the adjusting screw preferably extends in the direction of the central longitudinal axis of the roller part or parallel to the central longitudinal axis of the roller part.

In a further preferred embodiment of the invention, the adjusting element is movable as a whole, in particular exclusively, linearly, i.e., in a straight line. Through the prevention so achieved of a pivoting movement of the adjusting element about an axis, the carriage arrangement can be designed in a structurally particularly simple manner.

The mobility of the adjusting element is preferably proportional to the vertical mobility of the roller upper part relative to the running roller holder.

Further preferably, the adjusting element has a second adjusting element bevel, which is spaced apart from the first adjusting element bevel, in particular perpendicular to the longitudinal axis of the roller part. A particularly good load transfer of heavy wings is achieved within the height adjustment by the second adjusting element bevel.

For further constructional simplification of the carriage, the adjusting element can be designed in the form of a U-shaped sheet metal part.

The two adjusting element bevels can be formed at the free ends of the adjusting element. As a result, the adjusting element can be manufactured particularly easily.

Further preferably, the roller upper part can be formed mirror-symmetrically to the central vertical longitudinal plane of the roller part with the exception of the control slot, the adjusting element and/or the running roller holder.

For the transverse guidance of the carriage, the roller part can have a guide roller holder with a guide roller arranged or formed on the running roller holder, in particular immovably, and having a guide roller. The guide roller holder preferably has a vertical axis on which the guide roller is rotatably arranged. The guide roller can follow the movement of the running roller holder without being interfered with by the adjusting screw.

The mobility of the running roller holder is preferably achieved by the running roller holder being mounted on a horizontal pendulum axle. As a result, the running rollers of the running roller holder can run particularly well over unevennesses of the running rail.

The first adjusting element bevel and/or the second adjusting element bevel can be supported on the pendulum axle. Preferably, both adjusting element bevels lie on the pendulum axle from above, so that a movement of the adjusting element causes a lifting of the roller upper part from the running roller holder or a lowering of the roller upper part towards the running roller holder.

The roller upper part can have a slot for guiding the pendulum axle. The slot preferably extends vertically.

As an alternative to support on the pendulum axle, the first adjusting element bevel can be supported on a first upper part bevel of the roller upper part. By means of the first bevel pair consisting of the first upper part bevel and the first adjusting element bevel—in the case of a structurally simple design and easier operability—a relatively large-area contact of the roller upper part is achieved, so that the vertical position of heavy wings can also be adjusted with the height adjustment according to the invention.

Furthermore, the second adjusting element bevel can be supported on a second upper part bevel of the roller upper part.

For even better weight offloading of the height adjustment, the adjusting element can have a third adjusting element bevel which abuts a third upper part bevel of the roller upper part.

In addition, the adjusting element can have a fourth adjusting element bevel which abuts a fourth upper part bevel of the roller upper part.

The fourth adjusting element bevel is preferably spaced away from the third adjusting element bevel perpendicularly to the longitudinal axis of the roller part.

The third adjusting element bevel can be spaced away from the first adjusting element bevel parallel to the central longitudinal axis of the roller part and/or the fourth adjusting element bevel can be spaced away from the second adjusting element bevel parallel to the central longitudinal axis of the roller part. Preferably, the four adjusting element bevels are arranged in a rectangular arrangement in relation to one another in order to be able to offload the weight of the wing particularly uniformly.

The further bevel pairs enable the roller upper part to be supported over an even larger area without making operability more difficult. In fact, the further bevel pairs improve the guidance of the roller upper part and thus counteract a tilting of the roller upper part.

For guiding the running roller holder on the roller upper part, the roller upper part can have a first guide slot within which the pendulum axle is guided. The roller upper part can moreover have a second guide slot which is opposite the first guide slot, wherein the guide slots guide the ends of the pendulum axle.

For further constructive simplification, the roller upper part can have a block, in particular in the form of a metal block, in the upper side of which the control slot is formed and in the underside of which a recess, in particular in the form of a blind hole, is formed, in which the adjusting element at least partially enters.

The carriage can have a first roller bearing guide for guiding the transverse movement of the roller part relative to the wing part. The first roller bearing guide here can be designed to offload onto the roller part forces acting in the main plane. The main plane of the fixed frame is a vertical plane that intersects a running rail of the fixed frame. The first roller bearing guide enables the user to operate the wing significantly more comfortably while at the same time preventing the roller part from jamming on the wing part during the transverse movement.

The first roller bearing guide preferably extends perpendicular to the main plane. The first roller bearing guide can have a roller bearing bed on the wing part and a roller bearing bed on the roller part. The roller bearing beds are here preferably fastened immovably to the wing part or roller part. Rolling bodies of the first roller bearing guide are preferably supported in the direction of the longitudinal axis of the roller part on both roller bearing beds in order to offload forces in the direction of the longitudinal axis from the wing part into the roller part or vice versa.

In addition to the movement of the roller part in the transverse direction, an actuation of the driving bar and thus a displacement of the control projection in the control slot also causes a force on the roller part in the longitudinal direction. This force in the longitudinal direction can be offloaded with low friction by the first roller bearing guide.

The running rail runs in the main plane of the fixed frame. The running rollers of the roller part are designed to run on the running rail and intersect the main plane. The longitudinal axis of the roller part also runs in the main plane. The displacement direction of the wing placed away from the fixed frame extends in particular parallel to the main plane. The transverse movement for placing the wing away from the fixed frame or pressing the wing against the fixed frame preferably runs perpendicular to the main plane.

The first roller bearing guide can have a bearing part and a support rail. The support rail can via a convexly curved surface abut a concavely curved support surface of the bearing part with a ball raceway. As a result, forces in the main plane can be transferred from the wing part onto the roller part in a structurally particularly simple manner.

The bearing part will be structurally further simplified when the support surface in cross-section, i.e., in the main plane, takes the form of a circular arc, in particular a semicircle.

In order to avoid a pivoting of the bearing part about its longitudinal axis, the bearing part can be held by a form fit on the roller part or wing part.

Further preferably, the support rail has non-fixed free ends when viewed in its longitudinal direction. The support rail can then be fixed by a single central fastening means, for example a screw.

Furthermore, the support rail can also be inserted in a completely unfastened manner into a recess of the carriage.

Alternatively or in addition to the bearing part described, the first roller bearing guide can have a ball bearing extending in the longitudinal direction of the first roller bearing guide. The rolling bodies in the form of balls of the ball bearing can here be guided in roller bearing beds in the form of ball bearing beds. The ball bearing beds can in each case have a groove in which the balls are guided.

In a further preferred embodiment of the invention, the first roller bearing guide has a needle bearing, so that the high weight forces can be offloaded particularly reliably.

In a particularly preferred embodiment of the invention, the first roller bearing guide has a roller bearing bed, in particular in the form of a needle bearing bed, the surface of which is oriented at an angle between 0° and 180, in particular at an angle between 10° and 100°, in relation to the direction of the longitudinal axis of the roller part. As a result, the forces occurring in the direction of displacement can be offloaded particularly reliably into the roller part.

Further preferably, the carriage has a second roller bearing guide spaced apart from the first roller bearing guide in the direction of the longitudinal axis of the roller part in order to offload forces in a displacement direction particularly reliably from the wing part into the roller part. In particular, the second roller bearing guide particularly reliably prevents jamming of the roller part on the wing part.

The first roller bearing guide can be designed as a fixed bearing and the second roller bearing guide as a floating bearing. Alternatively, the first roller bearing guide can be designed as a floating bearing and the second roller bearing guide as a fixed bearing. As a result, tolerances can be compensated during the manufacture of the carriage.

Preferably, the control projection is arranged between the first and second roller bearing guides.

The second roller bearing guide can be designed identical to the first roller bearing guide in order to further simplify the design of the carriage.

The second roller bearing guide preferably extends perpendicular to the main plane. The second roller bearing guide can have a roller bearing bed on the wing part and a roller bearing bed on the roller part. The roller bearing beds are here preferably fastened immovably to the wing part or roller part. Rolling bodies of the second roller bearing guide are preferably in a manner supported in the direction of the longitudinal axis of the roller part on both roller bearing beds in order to offload forces in the direction of the longitudinal axis from the wing part into the roller part.

The roller part can be inserted into the wing part at least partially by means of a form fit, in particular a dovetail-shaped form fit. In this case, the roller part can be inserted into the wing part transversely, in particular perpendicularly, to the main plane in order to mount the roller part on the wing part.

In a further preferred embodiment of the invention, the wing part is formed in one piece. The wing part can have a straight guide slot through which the control projection is guided.

The control projection can have a plain bearing for the oblique guide slot of the roller part. Alternatively, the control projection can have a roller-bearing-guided roller for guiding the control projection in the oblique guide slot.

The control projection can have a plain bearing for the straight guide slot of the wing part. Alternatively, the control projection can have a roller-bearing-guided roller for guiding the control projection in the straight guide slot.

The driving bar arrangement can be fastened to the carriage. This considerably simplifies the installation of the carriage arrangement on the wing for the window fitter. Furthermore, this prevents dirt from getting into the carriage arrangement during installation of the carriage arrangement on the wing. As a result, it is further ensured that the carriage is aligned exactly in alignment with the driving bar arrangement and the movement of the control projection in the straight guide slot is ensured with low wear.

In order to fasten the driving bar arrangement to the carriage, a holding means can be provided. In particular, a clamp, a rivet, a screw and/or a metal plate provided with a hook can be provided as holding means. For fastening the driving bar arrangement to the carriage, the carriage arrangement preferably has two holding means, in particular two clamps, two rivets, two screws and/or two plates in each case provided with a hook.

The object according to the invention is further achieved by a window or a door with a carriage arrangement described here.

Further advantages of the invention can be found in the description and the drawings. Likewise, according to the invention, the aforementioned features and those which are to be explained below can each be used individually or together in any desired combinations. The embodiments shown and described are not to be understood as an exhaustive list, but, rather, have an exemplary character for the description of the invention.

Figure 1A:
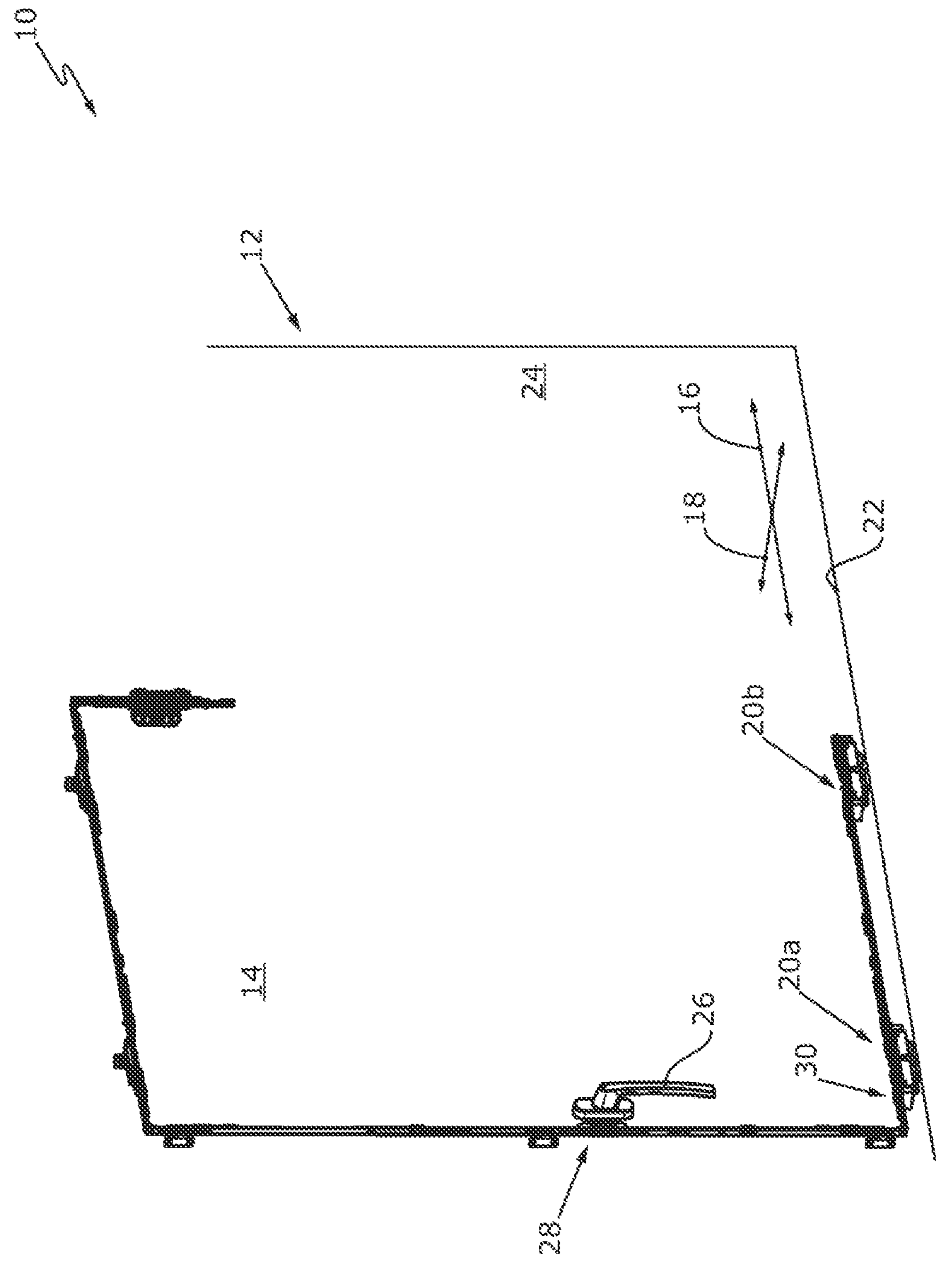
FIG. 1*a* shows a schematic isometric view of a door with a fixed frame and a wing displaceable relative to the fixed frame, wherein the wing is downwardly supported on two carriage arrangements.
Figure 1B:
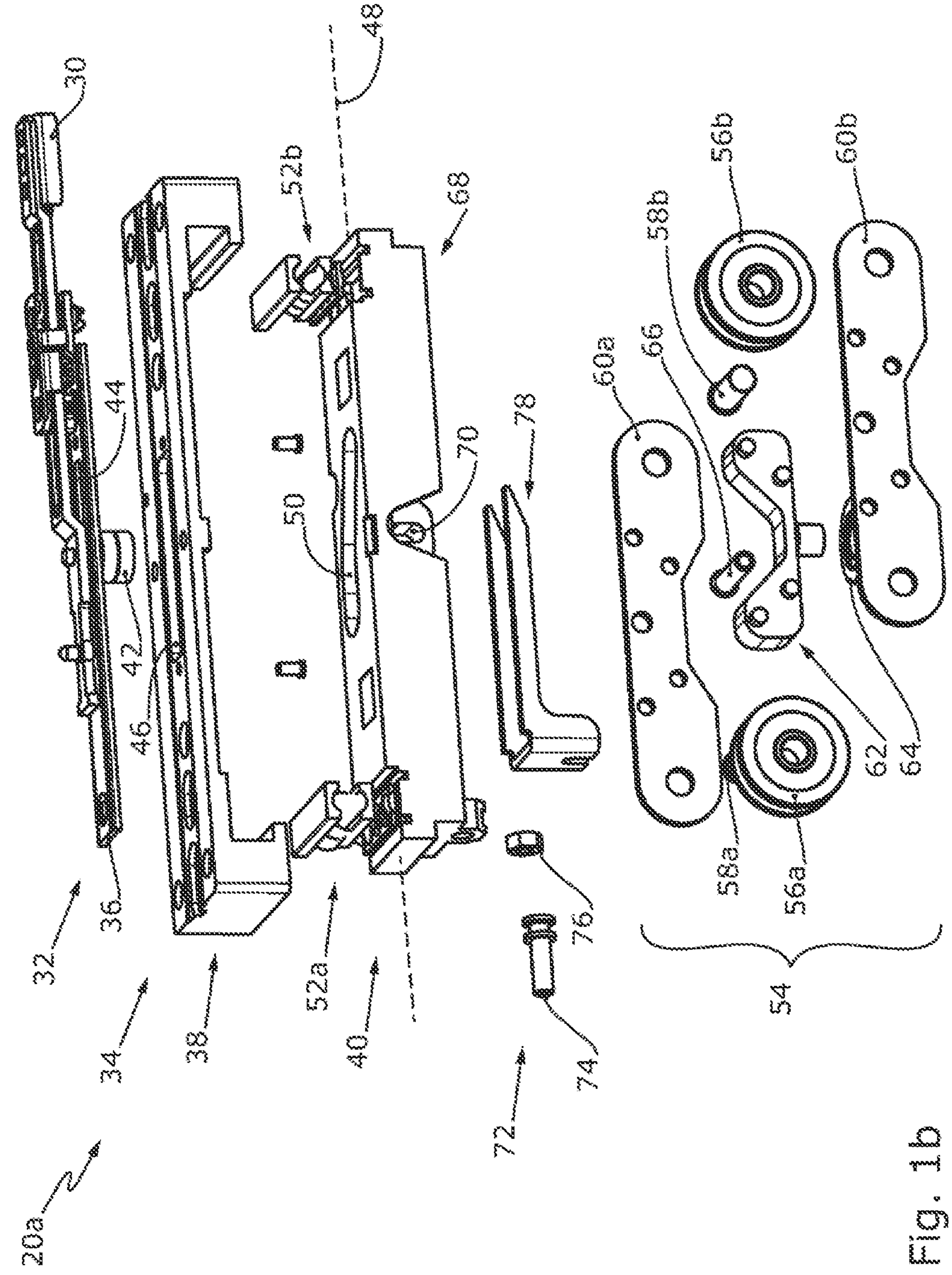
FIG. 1*b* is an exploded view of a carriage arrangement of FIG. 1*a*.
Figure 1C:
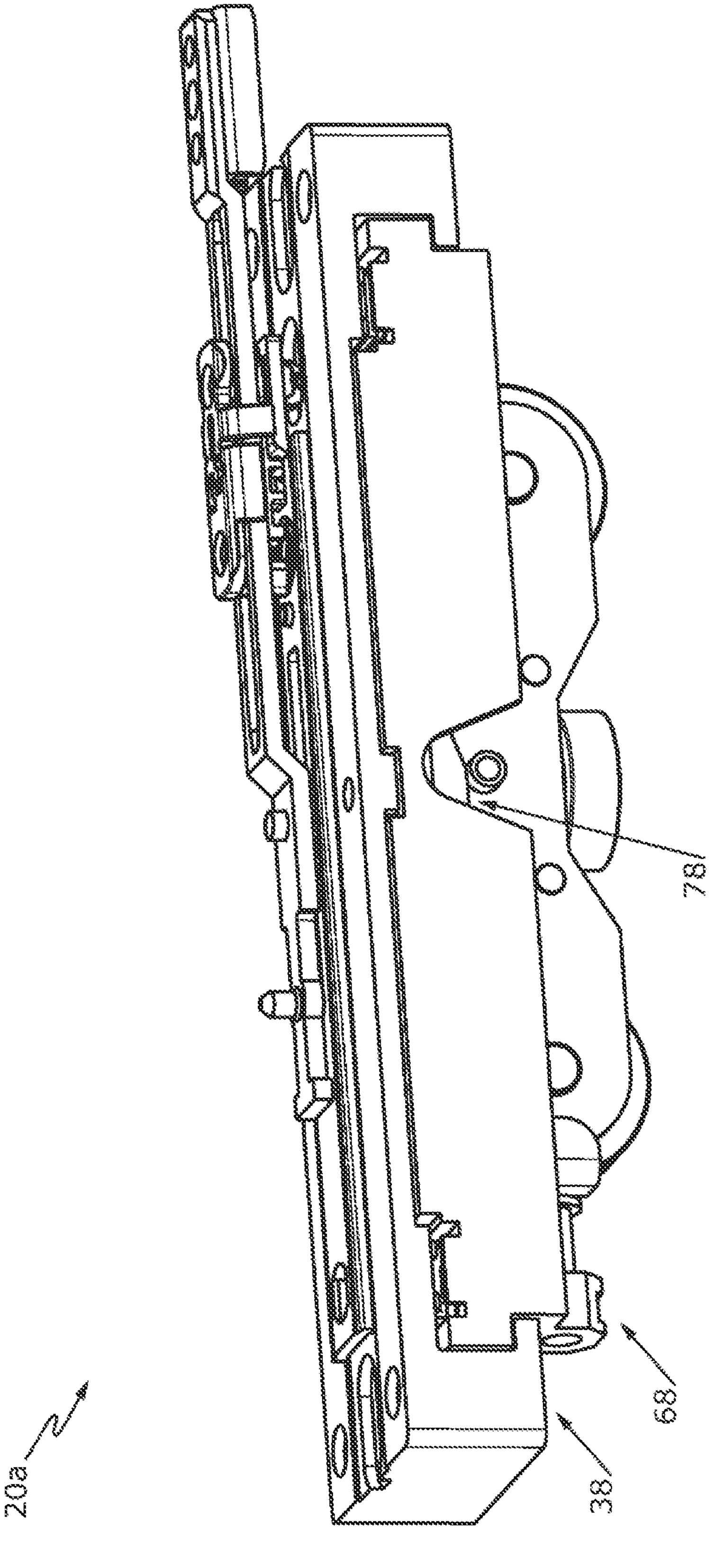
FIG. 1*c* shows an isometric view of the assembled carriage arrangement from FIG. 1*b*.
Figure 1D:
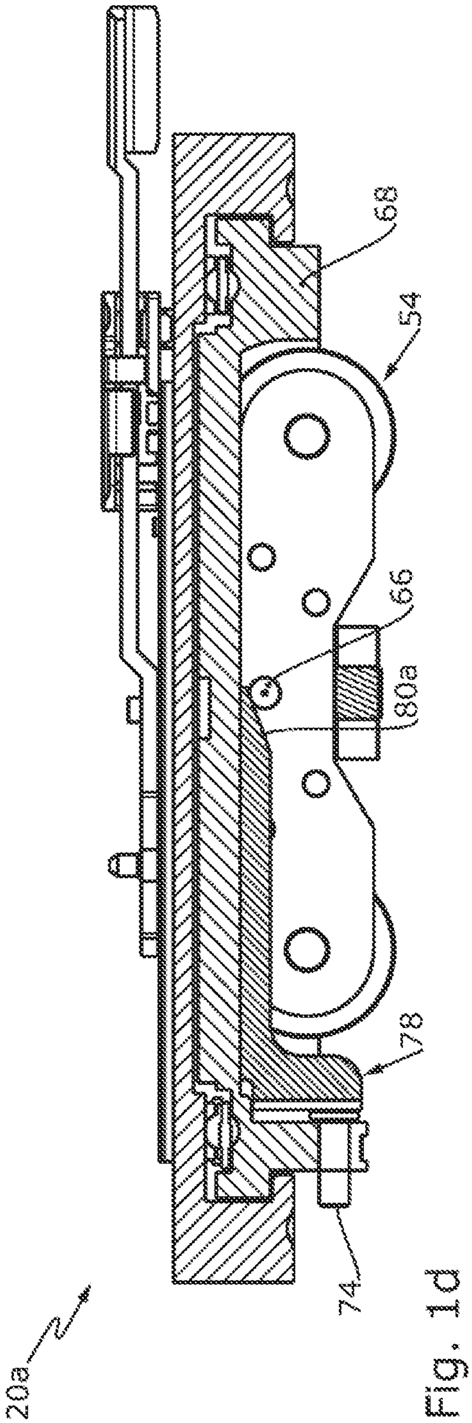
FIG. 1*d* shows a longitudinal section of the carriage arrangement from FIG. 1*c*, wherein the carriage arrangement is in the fully lowered position.
Figure 1E:
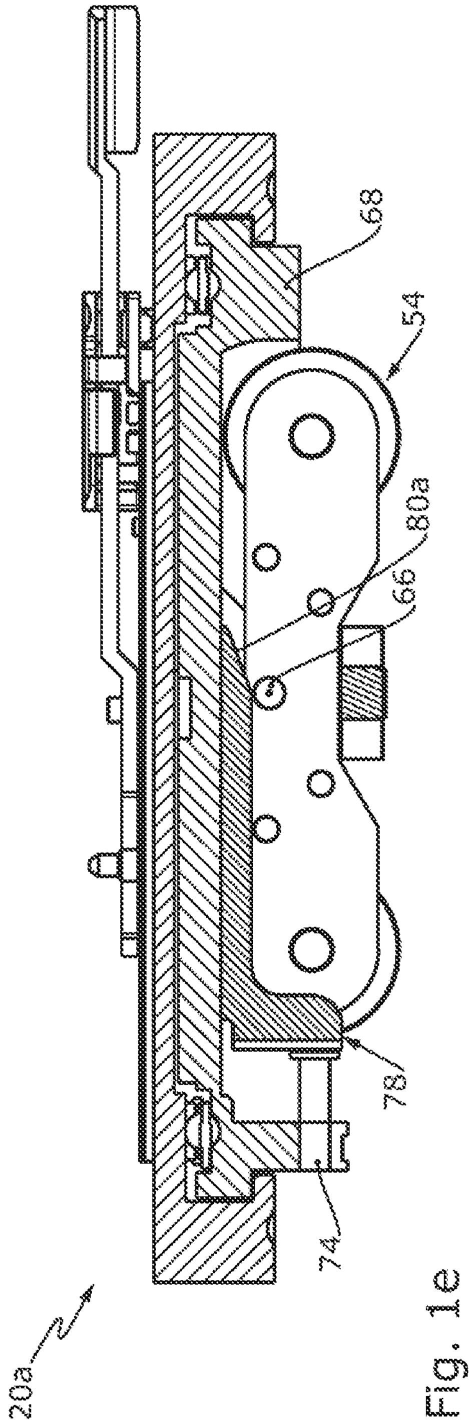
FIG. 1*e* shows the longitudinal section of the carriage arrangement from FIG. 1*d*, wherein the carriage arrangement is in the fully raised position.

FIG. if shows an isometric view of a roller upper part of the carriage arrangement from FIG. 1*e*.

Figure 1F:
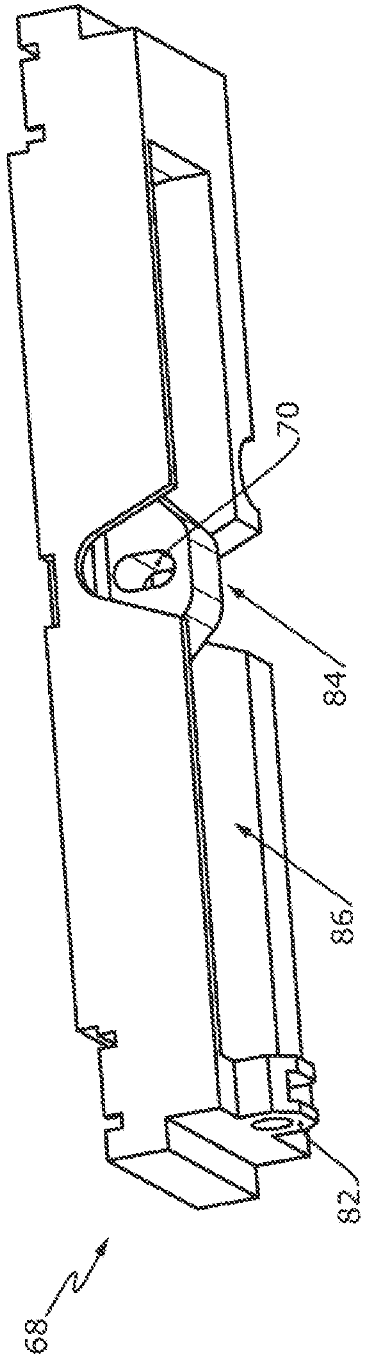
Figure 1G:
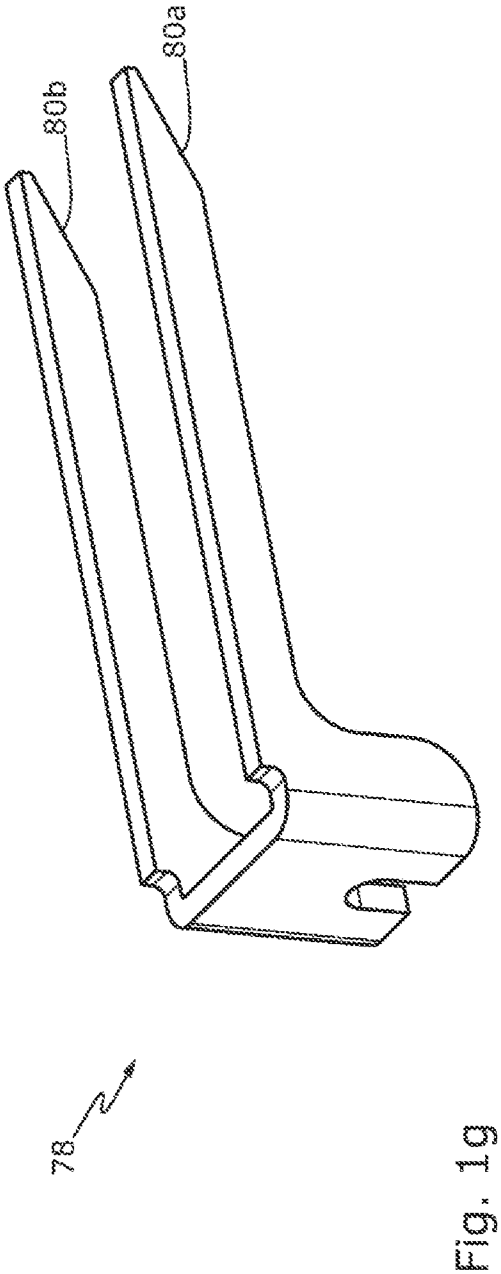

FIG. 1*g* shows an isometric view of an adjusting element from FIG. 1*e*.

Figure 2A:
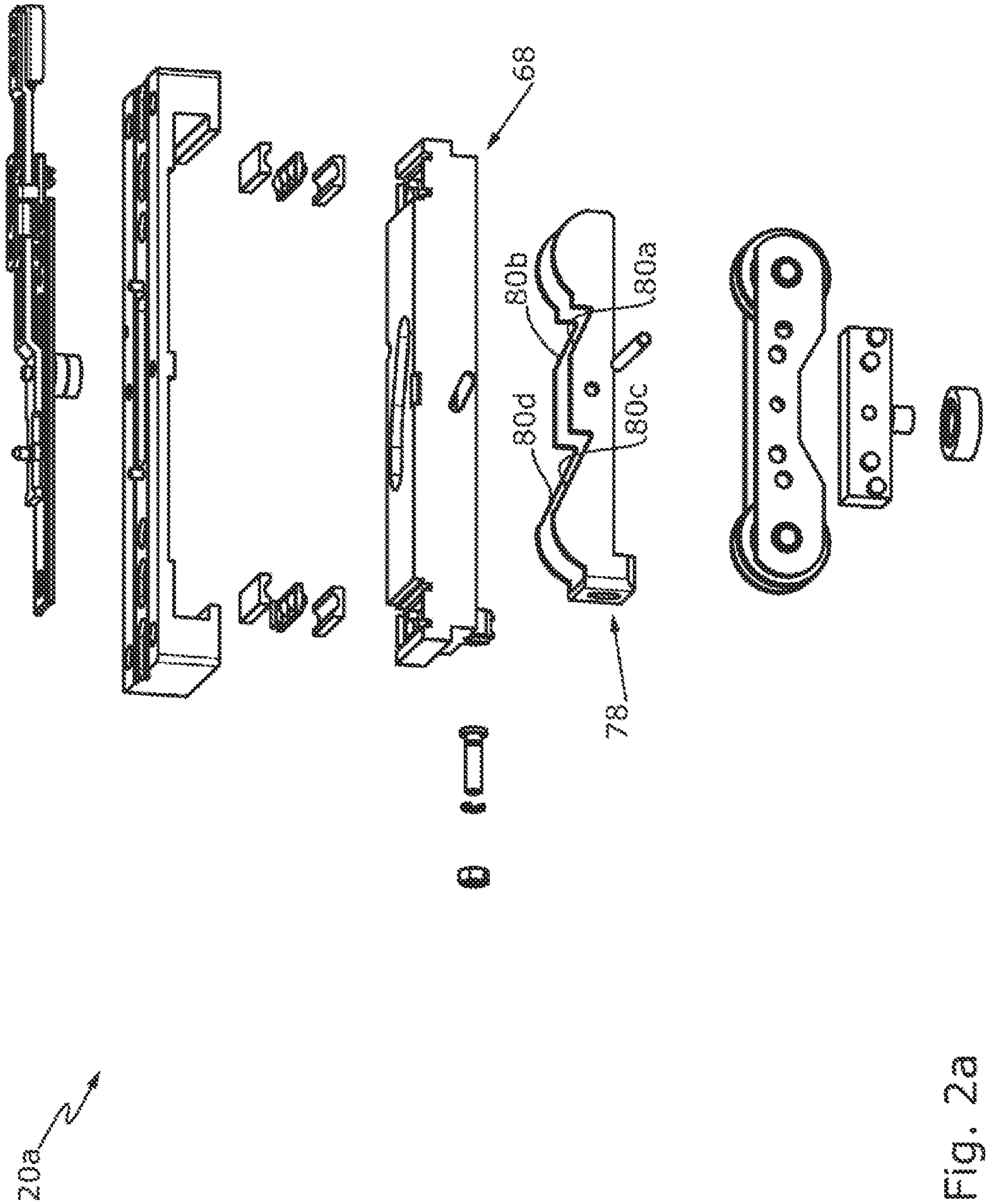

FIG. 2*a* shows an exploded view of a further exemplary embodiment of a carriage arrangement.

Figure 2B:
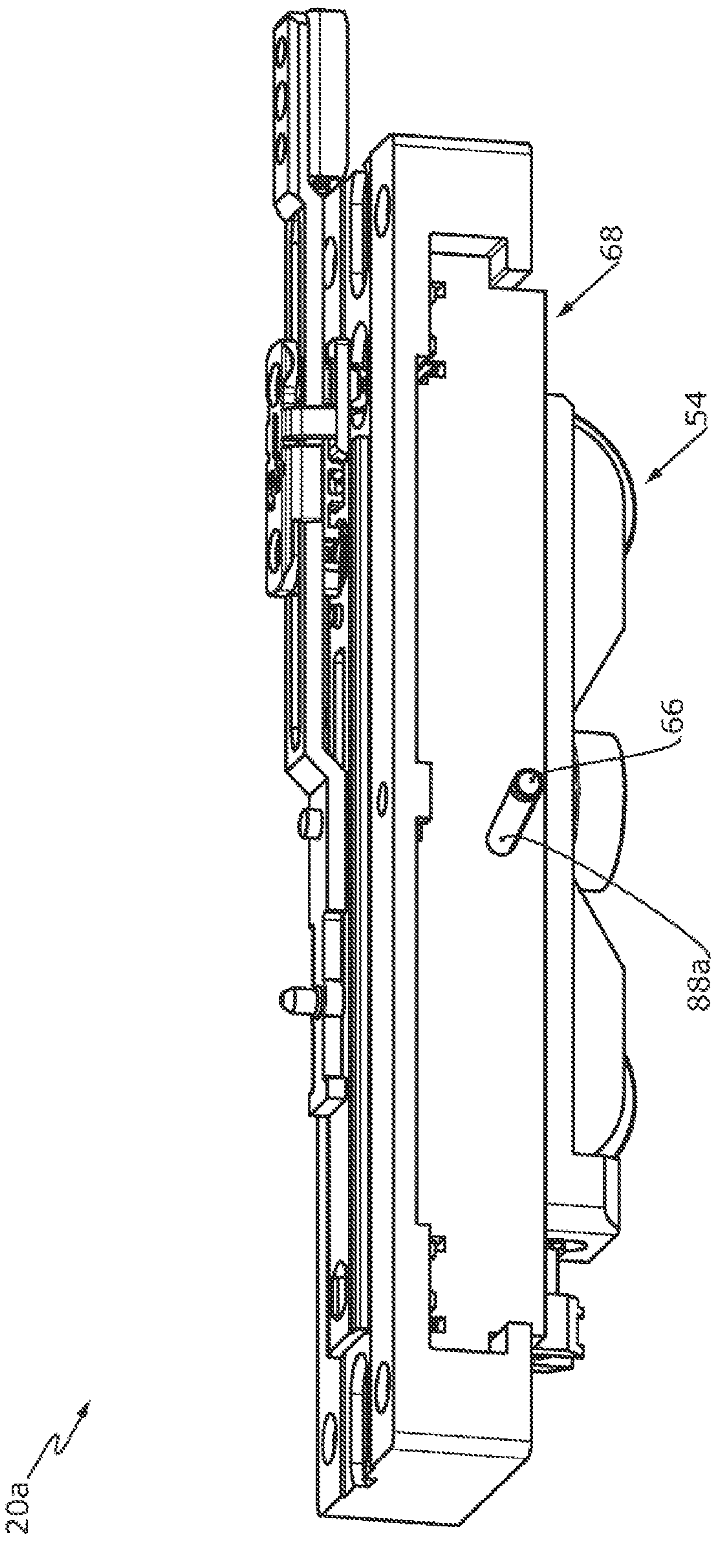

FIG. 2*b* shows an isometric view of the carriage arrangement from FIG. 2*a*.

Figure 2C:
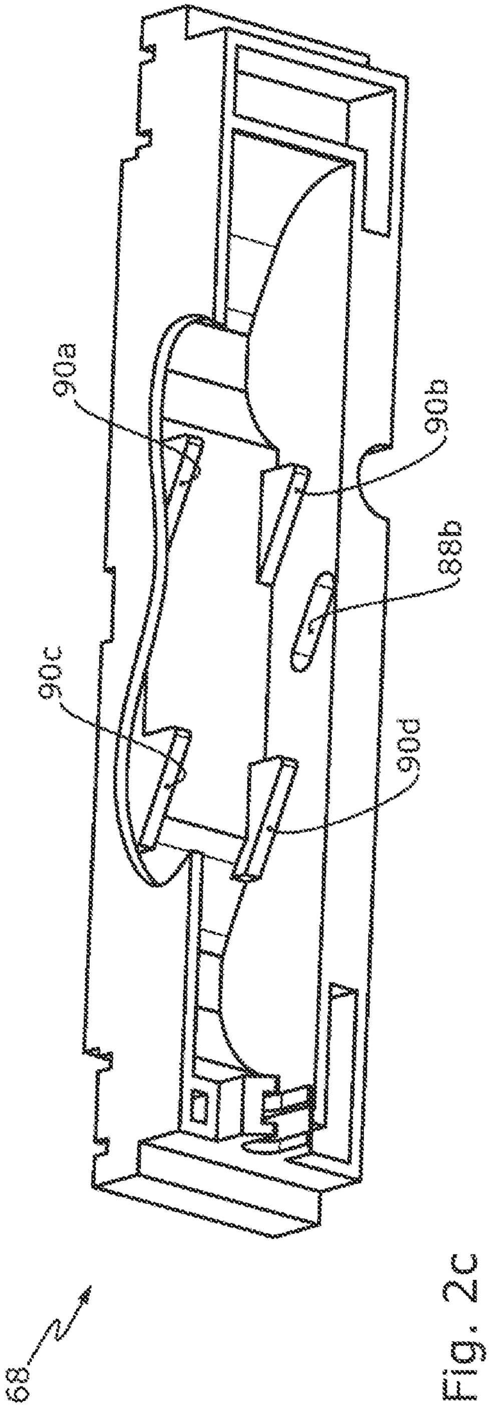

FIG. 2*c* shows an isometric view of a roller top part of the carriage arrangement from FIG. 2*b*.

Figure 2D:
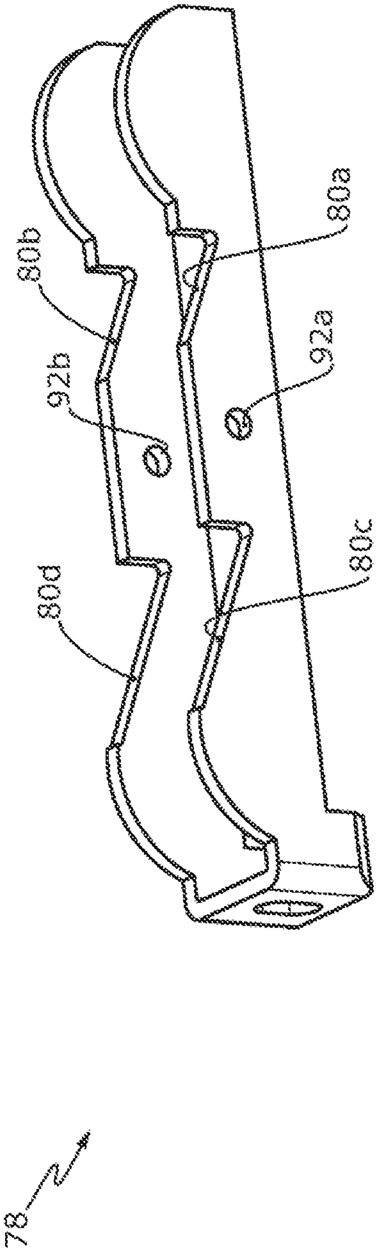

FIG. 2*d* shows an isometric view of an adjusting element from FIG. 2*b*.

Figure 2E:
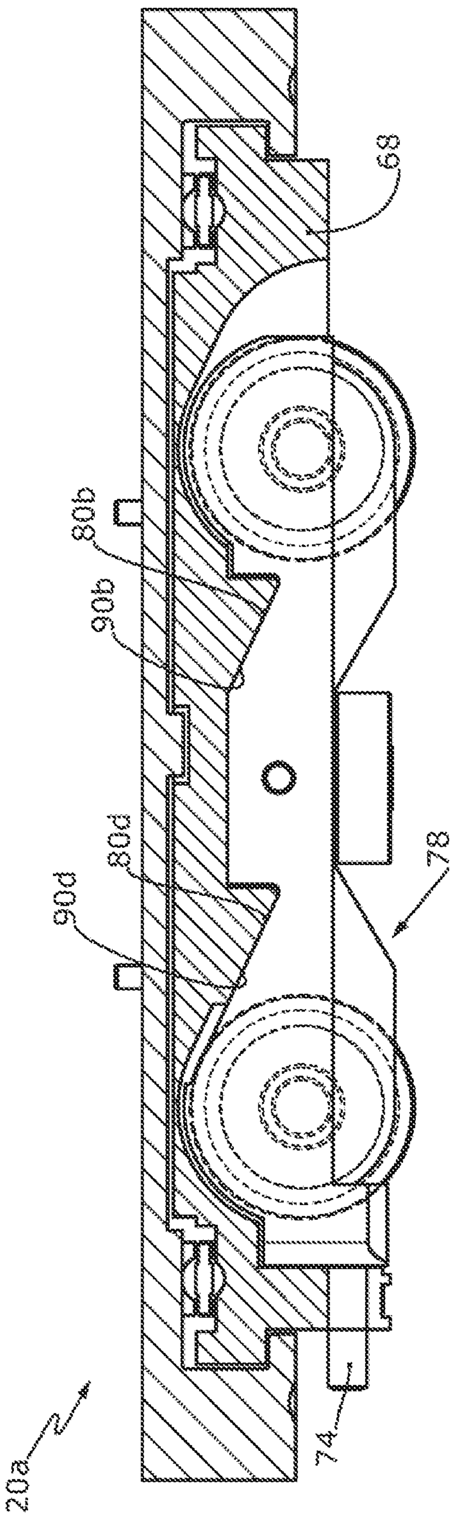

FIG. 2*e* shows a longitudinal section of the carriage arrangement from FIG. 2*b*, wherein the carriage arrangement is in the fully lowered position.

Figure 2F:
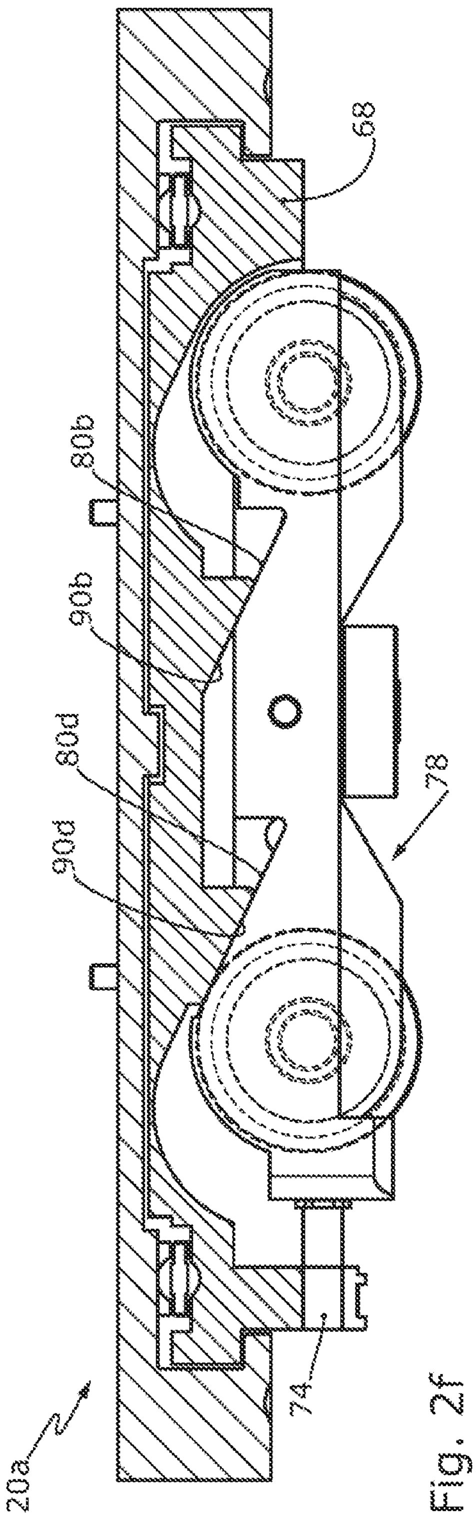

FIG. 2*f* shows the longitudinal section of the carriage arrangement from FIG. 2*c*, wherein the carriage arrangement is in the fully raised position.

DETAILED DESCRIPTION OF THE PREFERRED EMBODIMENTS

FIG. 1*a* shows a door 10 with a fixed frame 12 and a wing 14. The wing 14 is indicated by mountings. The wing 14 can be moved in the displacement direction 16 when it is no longer in sealing abutment against the fixed frame 12 but is placed away from the fixed frame 12. Both the displacement of the wing 14 in the displacement direction 16 and the movement of the wing 14 in the transverse direction 18 is made possible by at least one carriage arrangement, here two carriage arrangements, 20*a*, 20*b*.

The displacement of the carriage arrangements 20*a, b* in the displacement direction 16 takes place on a running rail 22. The running rail 22 lies in the main plane 24 of the fixed frame 12. The displacement of the wing 14 transversely to this main plane 24, i.e., in the transverse direction 18, takes place in a positively controlled manner by the actuation of a handle 26. The handle 26 is equipped with a mechanism 28 which translates the pivoting movement of the handle 26 into a linear movement of a driving bar 30.

The carriage arrangements 20*a, b* furthermore make it possible for a user to adjust the vertical position of the wing 14. The set vertical height remains unchanged during the usual opening and closing of the door 10.

The height settings of the two carriage arrangements 20*a, b* are preferably structurally identical.

FIG. 1*b* shows the carriage arrangement 20*a* with a driving bar arrangement 32 and a carriage 34. The driving bar arrangement 34 comprises the driving bar 30. The driving bar arrangement 34 can furthermore have a lipped rail 36.

The carriage 34 has a wing part 38 which can be fastened immovably on the wing 14 (see FIG. 1*a*) and a roller part 40 that is movable in the transverse direction 18 (see FIG. 1*a*). To produce this movement in the transverse direction 18, the driving bar 30 has a control projection 42. The control projection 42 can be guided through a slot 44 in the lipped rail 36. Furthermore, the control projection 42 can engage through a straight guide slot 46 of the wing part 38. The control projection 42 engages in a control slot 50 formed at least sectionally obliquely to the longitudinal axis 48 of the roller part 40. The wing part 38 can be supported on the roller part 40 by a first roller bearing guide 52*a*. Preferably, the wing part 38 is additionally supported on the roller part 40 by a second roller bearing guide 52*b*.

The carriage 34 furthermore comprises a running roller holder 54 with multiple rollers 56*a*, 56*b*. The running rollers 56*a, b* are held on guide plates 60*a*, 60*b* via roller axles 58*a*, 58 *b*. Furthermore, a guide roller holder 62 with a guide roller 64 rotatably mounted on the guide roller holder 62 can be arranged on the guide plates 60*a, b*. The guide roller 64 guides the carriage 34 in the transverse direction 18 (see FIG. 1*a*).

The running roller holder 54 is mounted pivotably on a roller upper part 68 via a horizontally extending pendulum axle 66. The roller upper part 68 has a vertically extending slot 70 for receiving the pendulum axle 66.

The guide roller holder 62 is preferably held rigidly on the guide plates 60*a, b*, so that a pendulum movement of the running roller holder 54 about the pendulum axle 66 is carried out not only by the running rollers 56*a, b* but also by the guide roller 64. Such a pendulum movement occurs, for example, when the carriage 34 runs over an obstacle, in particular dirt, on the running rail 22 (see FIG. 1*a*) or when the running rail has unevennesses, in particular "hills and valleys."

The carriage 34 comprises a height adjustment 72. The height adjustment 72 comprises at least one adjusting screw 74, here with a nut 76 and an adjusting element 78.

FIG. 1*c* shows the carriage arrangement 20*a* with the adjusting element 78 in the assembled state. As can be seen from FIG. 1*c*, the roller upper part 68 is arranged so as to be vertically immovable relative to the wing part 38. The roller upper part 68 is guided in the wing part 38 in the manner of a dovetail.

FIGS. 1*d* and 1*e* show a schematic sectional view of the carriage arrangement 20*a*. From a combination of FIGS. 1*d* and 1 *e* it can be seen that the adjusting element 78 comprises a first adjusting element bevel 80*a*, which is supported on the pendulum axle 66. A linear displacement of the adjusting element 78 with respect to the roller upper part 68 effected by the adjusting screw 74 causes a vertical adjustment of the running roller holder 54 relative to the roller upper part 68. A linear displacement of the adjusting element 78 effected by the adjusting screw 74 in particular causes a proportional vertical adjustment of the running roller holder 54 relative to the roller upper part 68. The adjusting screw 74 here does not directly abut the running roller holder 54, but rather the adjusting element 78, so that a pendulum movement of the running roller holder 54 takes place wear-free and uninfluenced by the adjusting screw 74.

FIG. 1*f* shows the roller upper part 68 with an adjusting screw guide 82. The roller upper part 68 can comprise a central guide projection 84 with the slot 70. The roller upper part 68 is preferably formed in one piece, in particular in the shape of a block. The roller upper part 68 can have an underside recess 86 for at least partially receiving the adjusting element 78.

FIG. 1*g* shows the adjusting element 78. It can be seen from FIG. 1*g* that the adjusting element 78, in addition to the first adjusting element bevel 80*a*, can have a second adjusting element bevel 80*b*. Both adjusting element bevels 80*a, b* are preferably supported on the pendulum axle 66 (see FIG. 1*b*).

FIG. 2*a* shows a further embodiment of a carriage arrangement 20*a*. The carriage arrangement 20*a* according to FIG. 2*a* corresponds to the carriage arrangement 20*a* previously described in FIGS. 1*a* to 1 *g*, except for the differences described below.

In addition to the first adjusting element bevel 80*a* and the second adjusting element bevel 80*b*, the adjusting element 78 has a third adjusting element bevel 80 and a fourth adjusting element bevel 80*d*. The adjusting element bevels 80*a-d* are supported on the roller upper part 68 (see FIG. 2*e*).

FIG. 2*b* shows the carriage arrangement 20*a* in the assembled state. It can be seen from FIG. 2*b* that the pendulum axle 66 is guided in a first guide slot 88*a* of the roller upper part 68. The first guide slot 88*a* does not serve for offloading weight from the roller upper part 68 onto the running roller holder 54, but exclusively for guiding the pendulum axle 66.

FIG. 2*c* shows the roller upper part 68 with a first upper part bevel 90*a*, a second upper part bevel 90*b*, a third upper part bevel 90*c* and a fourth upper part bevel 90*d*. The upper part bevels 90*a-d* are supported on respective adjusting element bevels 80*a-d* (see FIGS. 2*a* and 2*d*). FIG. 2*c* also shows in the upper roller part 68 a second guide slot 88*b* for receiving the pendulum axle 66 (see FIG. 2*b*). Moreover, the second guide slot 88*b* is not used for offloading weight from the roller upper part 68 onto the running roller holder 54 (see FIG. 2*b*), but exclusively for guiding the pendulum axle 66 (see FIG. 2*b*).

FIG. 2*d* shows the adjusting element 78 with the adjusting element bevels 80*a-d*. From FIG. 2*d*, it can also be seen that the adjusting element 78 has aligned receptacles 92*a*, 92*b*, here in the form of holes, for mounting the pendulum axle 66 (see FIG. 2*b*).

In a combination of FIGS. 2*e* and 2*f* the vertical adjustability of the carriage arrangement 20*a* can be seen. The adjusting element 78 is movable in a straight line relative to the roller upper part 68 by means of the adjusting screw 74.

The adjusting element bevels 80*b, d* visible in FIGS. 2*c* and 2*d* are here supported on upper part bevels 90*b, d.*

Taking a combination of all figures of the drawing together, the invention relates in summary to a carriage 34 with a wing part 38 which can be fastened to a wing 14 and a roller part 40 which is displaceable on a running rail 22, wherein the wing part 38 is positively displaceable transversely to the running rail 22. The roller part 40 has a height-adjustable roller upper part 68. The vertical adjustability of the roller upper part 68 with respect to a running roller holder 54 of the roller part 40 is achieved by an adjusting element 78 displaceable by means of an adjusting screw 74. The adjusting element 78 is preferably supported with at least one adjusting element bevel 80*a-d* on a pendulum axle 66 of the running roller holder 54 and/or on an upper part bevel 90*a-d* of the roller upper part 68.

LIST OF REFERENCE SIGNS

10 Door
12 Fixed frame
14 Wing
16 Displacement direction
18 Transverse direction
20*a, b* Carriage arrangement
22 Running rail
24 Main plane
26 Handle
28 Mechanism
30 Driving bar
32 Driving bar arrangement
34 Carriage
36 Lipped rail
38 Wing part
40 Roller part
42 Control projection
44 Slot
46 Straight guide slot
48 Longitudinal axis of the roller part 40
50 Control slot
52*a, b* Roller bearing guide
54 Running roller holder
56*a, b* Roller
58*a, b* Roller axis
60*a, b* Guide plate
62 Guide roller holder
64 Guide roller
66 Pendulum axle
68 Roller upper part
70 Slot
72 Height adjustment
74 Adjusting screw
76 Nut
78 Adjusting element
80*a* First adjusting element bevel
80*b* Second adjusting element bevel
80*c* Third adjusting element bevel
80*d* Fourth adjusting element bevel
82 Adjusting screw guide
84 Guide projection
86 Recess
88*a* First guide slot
88*b* Second guide slot
90*a* First upper part bevel
90*b* Second upper part bevel
90*c* Third upper part bevel
90*d* Fourth upper part bevel
92*a, b* Receptacle

What is claimed is:

1. A carriage arrangement for displacing a heavy wing of a window or door in the displacement direction parallel to the main plane of a fixed frame of the window or door and for shifting the wing transversely to this main plane, wherein the carriage arrangement comprises the following:
a) a driving bar arrangement arranged on the wing and which has a movable driving bar;
b) a carriage having a wing part fastened to the wing and a roller part which is displaceable transversely to the main plane and has a plurality of rollers for displacement in the displacement direction;
wherein the driving bar arrangement comprises a control projection which is arranged or formed on the driving bar and which is guided in a control slot of the roller part which is formed at least in sections obliquely to the main plane, wherein a movement of the driving bar causes a displacement of the roller part transversely to the main plane;
wherein the roller part further comprises the following:
c) a roller upper part with the control slot;
d) a running roller holder having the plurality of rollers;
e) an adjusting screw, configured to be actuated by a user, for height adjustment of the roller upper part relative to the running roller holder;
wherein the roller part comprises an at least horizontally adjustable adjusting element with a first adjusting element bevel, wherein the actuation of the adjusting screw causes the at least horizontal movement of the adjusting element and the adjusting element indirectly or directly effects an at least vertical movement of the running roller holder via the first adjusting element bevel.

2. The carriage arrangement according to claim 1, wherein the adjusting element is linearly movable as a whole.

3. The carriage arrangement according to claim 2, wherein the adjusting element has a second adjusting element bevel, which is spaced apart from the first adjusting element bevel perpendicular to the longitudinal axis of the roller part.

4. The carriage arrangement according to claim 1, wherein the adjusting element has a second adjusting element bevel, which is spaced apart from the first adjusting element bevel perpendicular to the longitudinal axis of the roller part.

5. The carriage arrangement according to claim 1, wherein the adjusting element is designed in the form of a U-shaped sheet metal part.

6. The carriage arrangement according to claim 1, wherein the roller part has a guide roller holder which is arranged or formed rigidly on the running roller holder and has a guide roller.

7. The carriage arrangement according to claim 1, wherein the running roller holder is mounted so that it can swing via a horizontal pendulum axle.

8. The carriage arrangement according to claim 7, wherein the first adjusting element bevel is supported on the pendulum axle.

9. The carriage arrangement according to claim 8, wherein the roller upper part has a slot for guiding the pendulum axle.

10. The carriage arrangement according to claim 7, wherein the roller upper part has a slot for guiding the pendulum axle.

11. The carriage arrangement according to claim 1, wherein the first adjusting element bevel abuts a first upper part bevel of the roller upper part.

12. The carriage arrangement according to claim 3, wherein the first adjusting element bevel abuts a first upper part bevel of the roller upper part.

13. The carriage arrangement according to claim 12, wherein the second adjusting element bevel abuts a second upper part bevel of the roller upper part.

14. The carriage arrangement according to claim 13, wherein the adjusting element comprises a third adjusting element bevel that abuts a third upper part bevel of the roller upper part.

15. The carriage arrangement according to claim 14, wherein the adjusting element has a fourth adjusting element bevel that abuts a fourth upper part bevel of the roller upper part.

16. The carriage arrangement according to claim 7, wherein the first adjusting element bevel abuts a first upper part bevel of the roller upper part.

17. The carriage arrangement according to claim 16, wherein the roller upper part has a first guide slot in which the pendulum axle is guided.

18. The carriage arrangement according to claim 1, wherein the roller upper part comprises a block, in the form of a metal block, in the upper side of which the control slot is formed and in the underside of which a vertically extending recess is formed, in which the adjusting element is at least partially accommodated.

19. The window or door comprising the fixed frame and the wing and the carriage arrangement according to claim 1, wherein by means of the carriage arrangement the wing is displaceable in the displacement direction parallel to the main plane of the fixed frame and transversely to this main plane.

20. A carriage arrangement for displacing a heavy wing of a window or door in the displacement direction parallel to the main plane of a fixed frame of the window or door and for shifting the wing transversely to this main plane, wherein the carriage arrangement comprises the following:

a) a driving bar arrangement arranged on the wing and which has a movable driving bar;

b) a carriage having a wing part fastened to the wing and a roller part which is displaceable transversely to the main plane and has a plurality of rollers for displacement in the displacement direction;

wherein the driving bar arrangement comprises a control projection which is arranged or formed on the driving bar and which is guided in a control slot of the roller part which is formed at least in sections obliquely to the main plane, wherein a movement of the driving bar causes a displacement of the roller part transversely to the main plane;

wherein the roller part further comprises the following:

c) a roller upper part with the control slot;

d) a running roller holder having the plurality of rollers;

e) an adjusting screw, configured to be actuated by a user, for height adjustment of the roller upper part relative to the running roller holder;

wherein the roller part comprises an at least horizontally adjustable adjusting element with a first adjusting element bevel, wherein the actuation of the adjusting screw causes the at least horizontal movement of the adjusting element and the adjusting element indirectly or directly effects an at least vertical movement of the running roller holder via the first adjusting element bevel;

wherein the roller upper part comprises a block, in the form of a metal block, in the upper side of which the control slot is formed and in the underside of which a vertically extending recess is formed, in which the adjusting element is at least partially accommodated.

* * * * *